United States Patent [19]

Inui et al.

[11] Patent Number: 5,768,568
[45] Date of Patent: Jun. 16, 1998

[54] SYSTEM AND METHOD FOR INITIALIZING AN INFORMATION PROCESSING SYSTEM

[75] Inventors: Takashi Inui, Yokohama; Kazumi Itoh, Sagamihara; Ken Inoue, Yamato, all of Japan

[73] Assignee: International Business Machines Corp., Armonk, N.Y.

[21] Appl. No.: 790,811

[22] Filed: Jan. 30, 1997

Related U.S. Application Data

[63] Continuation of Ser. No. 235,727, Apr. 29, 1994, abandoned.

[51] Int. Cl.$^6$ .................................................. G06F 9/44
[52] U.S. Cl. .................. 395/500; 395/284; 395/651; 395/712; 395/828; 395/830; 395/836
[58] Field of Search .................. 395/500, 828, 395/830, 839, 651, 284, 836, 712; 364/234, 235, 239, DIG. 1

[56] References Cited

U.S. PATENT DOCUMENTS

| | | | |
|---|---|---|---|
| 4,562,535 | 12/1985 | Vincent et al. | 395/284 |
| 4,593,353 | 6/1986 | Pickholtz | 364/200 |
| 4,622,633 | 11/1986 | Ceccon et al. | 395/700 |
| 4,672,532 | 6/1987 | JongeVos | 364/200 |
| 4,688,169 | 8/1987 | Joshi | 364/200 |
| 4,748,561 | 5/1988 | Brown | 364/300 |
| 4,757,534 | 7/1988 | Matyas et al. | 380/25 |
| 5,014,193 | 5/1991 | Garner et al. | 364/200 |
| 5,022,077 | 6/1991 | Bealkowski et al. | 380/4 |
| 5,128,995 | 7/1992 | Arnold et al. | 380/4 |
| 5,136,713 | 8/1992 | Bealkowski et al. | 395/700 |
| 5,165,018 | 11/1992 | Simon | 395/300 |
| 5,210,875 | 5/1993 | Bealkowski et al. | 395/700 |
| 5,257,368 | 10/1993 | Benson et al. | 395/600 |
| 5,257,379 | 10/1993 | Cwiakala et al. | 395/700 |
| 5,297,262 | 3/1994 | Cox et al. | 395/325 |
| 5,353,432 | 10/1994 | Richek et al. | 395/500 |
| 5,355,489 | 10/1994 | Bealkowski et al. | 395/700 |

*Primary Examiner*—Kevin J. Teska
*Assistant Examiner*—Thai Phan
*Attorney, Agent, or Firm*—George E. Grosser

[57] ABSTRACT

An information processing system and method is disclosed that can automatically establish a software environment suitable for a hardware configuration without the operator's intervention even if the hardware configuration for the information processing system changes. This is accomplished by establishing a file of system configurations describing the data for any previously established software system environment. The file is stored in the information processing system and is changed based on any hardware changes so that the software system configuration can also change.

3 Claims, 6 Drawing Sheets

```
FIRES-20
DOS-HIGH
BREAK-ON
BUFFERS-25,8
FCBS-20,8
LASTDRIVE-E
DEVICE-C:¥DOS¥HIMEM. SYS
DEVICE-C:¥DOS¥SETVER. EXE
SHELL-C:¥DOS¥COMMAND. COM /P /E:256
DEVICE-C:¥DOS¥EMM386. EXE AUTO rem ** Check Configuration,
rem    if CONFIG#-0, 1 then start LAN
IF CONFIG#-0, 1
   DEVICE-C:¥LAN. SYS
END IF

INSTALL C:¥DOS¥FASTOPEN. EXE C:-(150, 150)
```

— CONDITIONAL STATEMENT

SYSTEM AND METHOD FOR INITIALIZING AN INFORMATION PROCESSING SYSTEM

The application is a continuation, of application Ser. No. 08/235,727, filed Apr. 29, 1994, now abandoned.

BACKGROUND OF THE INVENTION

1. Technical Field

The present invention relates generally to information processing systems and more particularly to the initialization of an information processing system. Specifically, the invention relates to the initialization of a software environment involved with an information processing system, which uses different hardware configurations, by including at least one or more add-on devices, such as adapter cards, expansion units, or the like, capable of being attached or detached to or from the system.

2. Description of the Related Art

Information processing systems are well known in the art and typically use a hardware and software initialization to ready the system for operation. First, a hardware initialization is performed to access each add-on unit, such as, for example, adapter cards, expansion units, or the like, based on hardware initialization information retained in a non-volatile memory in the information processing system. If an add-on unit is, for example, an extended memory card, the hardware initialization information contains a memory address space value assigned to the memory card. If the add-on unit is, for example, a video control card, the hardware initialization information contains both an I/O address space value and an interruption priority value for the card. For an adapter card on which a ROM is mounted, the hardware initialization information contains a memory address space value assigned to the ROM.

After the completion of the hardware initialization, a corresponding software initialization is performed that installs device drivers or application programs into a system memory in the information processing system or sets a buffer for temporarily storing data during data read or write operations from or to a disk storage apparatus in the system memory. A system initializing program in an operating system, such as, for example, MS-DOS, performs software initialization by referencing system configuration defining data. The system configuration defining data describes the system configuration to be established. The system configuration refers to an environment on software or a use condition. A file containing the system configuration defining data may be called CONFIG.SYS, which is contained in a root directory of a start drive and referenced by the system initializing program each time the information processing system is started.

Some information processing systems, such as a notebook personal computer (PC), may be used in a variety of different hardware configurations. For example, the notebook PC may be connected to an expansion unit for use as a desktop computer in order to add a communication or printing capabilities. This is in addition to its being used as a portable computer without the expansion unit. Currently, card-type add-on peripheral units, such as extended memory cards, are widely used. These add-on peripheral cards may need frequent connection or disconnection and, accordingly, the system may be used in a variety of hardware configurations.

Each time hardware configuration changes are needed for the information processing system, initialization data for hardware configuration must be usually created again. However, according to Japanese Published Unexamined Patent Application (JPUPA) No.3-290405 (Incorporation Reference No.JA991025), applied by this applicant on Oct.11, 1991, and corresponding to U.S. Pat. application Ser. No. which is now U.S. Pat. No. 5,497,490, filed Jul. 8, 1992 it is unnecessary to recreate initialization data for hardware configurations even after changes to hardware configuration are made. According to the application, frequent changes to hardware configuration would not force an operator to do time-consuming work.

Unfortunately, no method or system has been proposed that automatically changes the contents of the software initialization file, according to a change to the hardware configuration. Therefore, what is needed is a system and method for reconfiguring the software environment, or CONFIG.SYS file, automatically when an add-on unit is added to the information processing system, as well as adding a device driver program for driving the add-on unit in the starting disk storage apparatus. If the operator does not add the device driver program to the CONFIG.SYS file, the device driver program for starting that adapter card is not installed in the system memory, and the adapter card is prevented from being started.

Further, if a device driver program is provided in the starting disk storage apparatus and specified in CONFIG.SYS, although the corresponding unit is not included in the information processing system, the system results in an error state and in some cases, further processing by the system cannot be performed without key input by the operator.

JPUPA No.63-172338 discloses a method of configuring the system in which a plurality of system configuration defining data are previously created and reside in the system and any of them is selected during bringing up the system start up. However, in the method, the system configuration defining data may be selected only by the operator's intervention and the contents of the software initialization are not automatically changed.

SUMMARY OF THE INVENTION

It is therefore one object of the present invention to provide an information processing system in which, even after a change to hardware configuration for the information processing system is made, a software environment suitable for a hardware configuration is automatically established and a method for initializing the information processing system.

According to the present inventions, an information processing system is disclosed that includes means for storing system configuration defining data referenced during initialization of the information processing system. Means are provided for initializing the information processing system by referencing the system configuration defining data. Also, means are provided for detecting a current hardware configuration for the information processing system. The system configuration defining data contains a description of a conditional statement that causes the contents of system configuration to be changed according to the current hardware configuration.

Further, a method of initializing the information processing system is also disclosed. According to the present invention, the method uses previously stored system configuration defining data to initialize the information processing system by referencing the system configuration defining data. Next, the method determines the contents of system configuration to be changed according to a hardware configuration in the system configuration defining data. Then, the method detects the hardware configuration for the system during starting or resetting the system. Finally, the system processes the software system configuration based on the hardware configuration detected.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
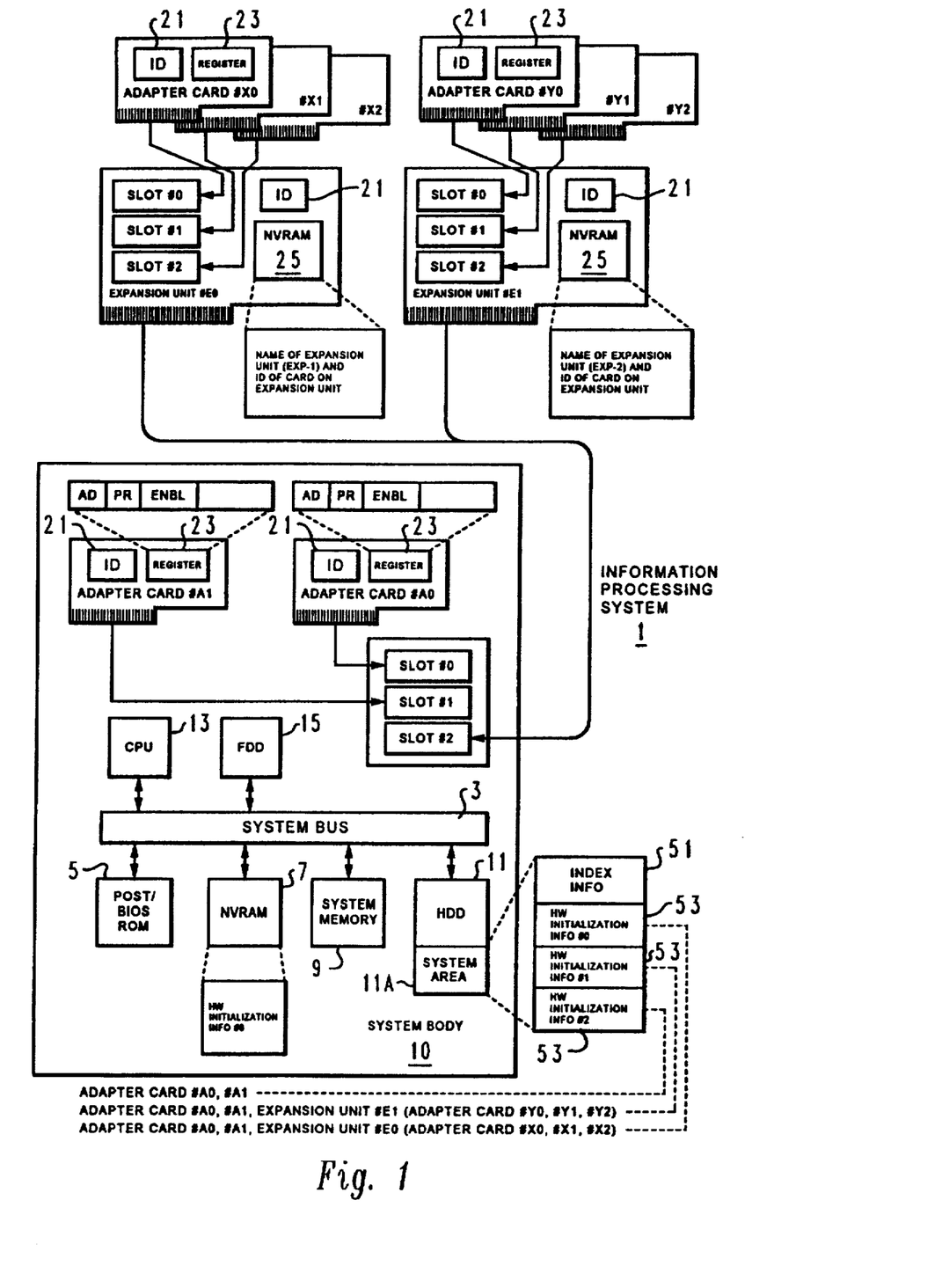
FIG. 1 is a block diagram showing an information processing system according to the present invention.

In the following, an embodiment of the present invention is described by reference to drawings. FIG. 1 shows an embodiment of an information processing system 1 according to the present invention. Information processing system 1 may provide various hardware configurations by including one or more units capable of being attached or detached to or from a system body 10 therein. Referring to the figure, connected to a system bus 3 in the system body 10 are multiple slots #0, #1, and #2 into which various add-on units, or adapter cards are interchangeably inserted. The adapter cards are used to control various peripheral apparatuses, such as a disk drive apparatus, a printer, a communication device, an extended memory, etc., that are connected to the respective adapter cards. Further, connected to the system bus 3 are a POST/BIOS ROM 5, a NVRAM 7 (non-volatile memory), a system memory 9, a hard disk drive (HDD) 11, a CPU 13, and a floppy disk drive (FDD) 15. The HDD 11 is used also as means for retaining system configuration defining data, which is described in greater detail below.

The embodiment of FIG. 1 shows that inserted into the slots #0 and #1 within the system body 10 are adapter cards #A0 and #A1, respectively, and inserted into the slot #2 is any of expansion units #E0 and #E1. Inserted into slots #0, #1, and #2 on one expansion unit #E0 are adapter cards #X0, #X1, and #X2, respectively. Inserted into slots #0, #1, and #2 on the other expansion unit #E1 are adapter cards #Y0, #Y1, and #Y2, respectively.

Each of these adapter cards and expansion units has a unique identifier value (ID) for identifying each of their types. That is, the adapter cards and the expansion units each have their identifier values assigned, each of which is composed of a predetermined number of bits and identifier value storing means 21 for holding the respective identifier values even after the system is turned off.

Each adapter card is provided with a programmable option slot (POS) register 23 into which hardware initialization information on each adapter card is stored. The hardware initialization information can be changed according to hardware configuration for the entire information processing system 1. Only information on the appropriate card from the hardware initialization information is transferred to the register 23 from the NVRAM 7 storing all the information on the hardware configuration for the system 1. The hardware initialization information includes, for example, an address factor (AD) that allocates addresses in memory space or I/O space, interrupt priority for a signal to the CPU 13 from an adapter card, information on allocating different priority to each of the same type of multiple cards (PR), if used, information on enabling redundant cards (ENBL), just to name a few. The system efficiently transfers data, based on such information, between the CPU 13 and the cards, as well as between the cards.

In addition to the identifier value storing means (ID) 21, the expansion unit #E0 has an NVRAM 25. Information on identification is written to the NVRAM 25 by the execution of a set up program after the connection of the expansion unit #E0 to the system body 10. The NVRAM 25 thus obtains not only identifier values of all adapter cards inserted into the slots on the expansion unit #E0, but also the name of the expansion unit #E0. Even if the expansion units are of the same type, their identifier values are the same, and all inserted adapter cards are of the same type (ID), only hardware initialization information set by an operator may differ between plural expansion units. The names of the expansion units contained in the NVRAM 25 ensure that the expansion units are distinguished from one another even in such a case and may be specified or given through the use of the set up program or the like by the operator.

FIG. 1 further illustrates expansion units #E0 and #E1. EXP-1 is the name of expansion unit #E0, in which the adapter cards #X0, #X1, and #X2 are inserted into slots #0, #1, and #2, respectively. EXP-2 is the name of the expansion unit #E1, in which the adapter cards #Y0, #Y1, and #Y2 are inserted into slots #0, #1, and #2, respectively.

The NVRAM 7 within the system body 10 contains initialization information on the entire hardware configuration for the information processing system 1, including the adapter cards inserted in the system body 10 and the expansion units. When a new hardware configuration is adopted, initialization information on the new hardware configuration is created and then the information is stored in the NVRAM 7 by means of a program SC (SYSTEM CONFIGURATION) .EXE. This is described later by reference to FIG. 3. The contents of the NVRAM 7 are also retained by a backup battery after the system is shut down.

In the embodiment of FIG. 1, hardware initialization information #0 is stored in the NVRAM 7. The hardware initialization information #0 is hardware initialization information obtained when the slots #0, #1, and #2 within the system body 10 are connected to the add-on adapter cards #A0, #A1, and the expansion unit #E0, respectively, and slot #0, #1, and #2 on the expansion unit #E0 are connected to the add-on adapter cards #X0, #X1, and #X2, respectively.

A reserved or system area (partition area) 11A of the disk storage apparatus 11 contains not only the hardware initialization information #0, but also hardware initialization information #1, hardware initialization information #2, and predetermined amounts of other hardware initialization information. Now, the hardware initialization information #1 is hardware initialization information obtained when the adapter cards #A0 and #A1, and the expansion unit #E1 are connected to the slots #0, #1, and #2 within the system body 10, respectively; and the adapter cards #Y0, #Y1, and #Y2 are connected to the slots #0, #1, and #2 on the expansion unit #E1, respectively. The hardware initialization information #2 is hardware initialization information obtained when the adapter cards #A0 and #A1 are connected to the slots #0 and #1, respectively and no adapter card is connected to the slot #2 within the system body 10.

Figure 2:
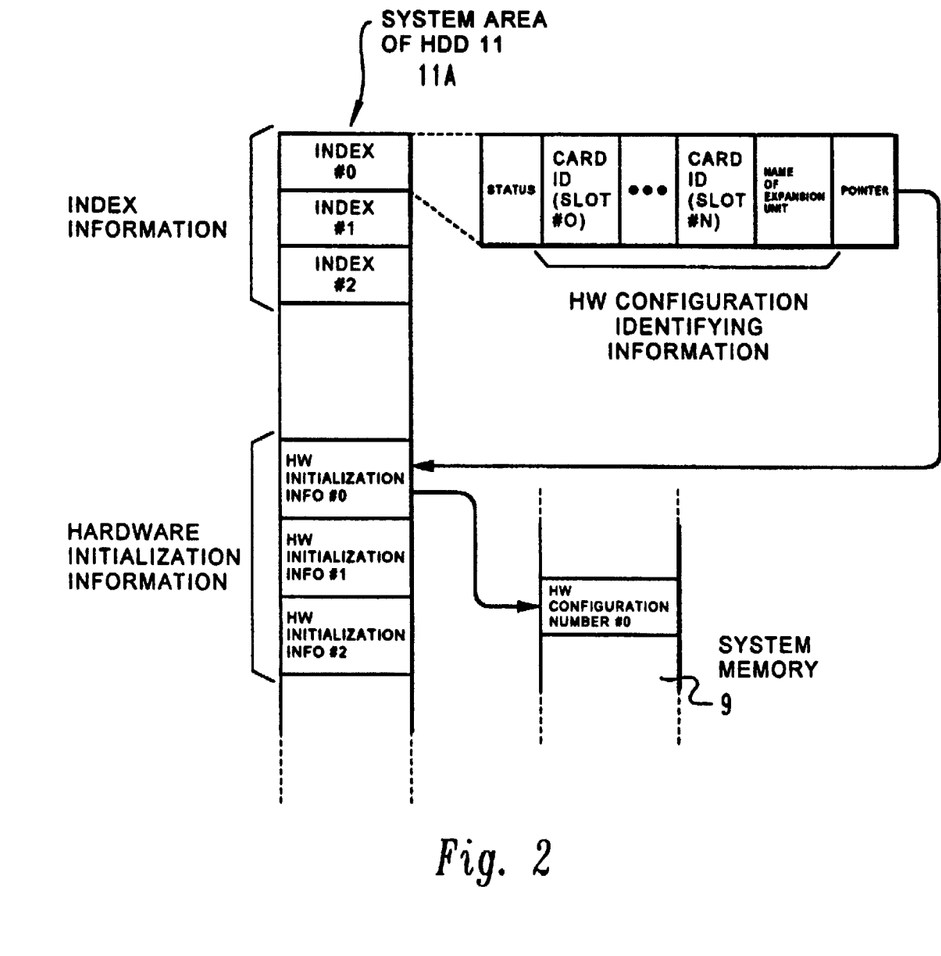
FIG. 2 depicts a block diagram showing the structure of the hardware initialization information and hardware configuration identifying information according to the present invention.

FIG. 2 shows the structure of information stored in the system area 11A of the disk storage apparatus 11. When a new hardware configuration is adopted, hardware initialization information 53 is created and stored in the NVRAM 7 by the SC.EXE program, and a copy of the information is also loaded into the disk storage apparatus 11 by a power-on self test (POST) program. When the hardware initialization information in the NVRAM 7 is copied into the disk storage apparatus 11, index information 51 is attached as shown in FIG. 2. That is, hardware initialization information #0, #1, and #2 are each stored in the form that they can be retrieved with the identifier values for the adapter cards and the names of the expansion units. The identifier values for the adapter cards and the expansion unit names are stored with the slot numbers in which they are inserted. Such information as is necessary for identifying a hardware configuration is called hardware configuration identifying information.

Referring to FIG. 2, each index #0, #1, or #2 starts with status information. The status information indicates whether or not the hardware configuration identifying information is contained in that index and is used to increase the efficiency of search using the index information 51. Each index contains pointer information at its end. The pointer information points to the storage location of hardware initialization information corresponding to a hardware configuration. As described later with reference to FIG. 4, the POST writes hardware configuration identifying numbers corresponding to respective hardware configurations to predetermined areas in the system memory 9. An example of the predetermined areas herein mentioned is a data area for BIOS.

Figure 3:
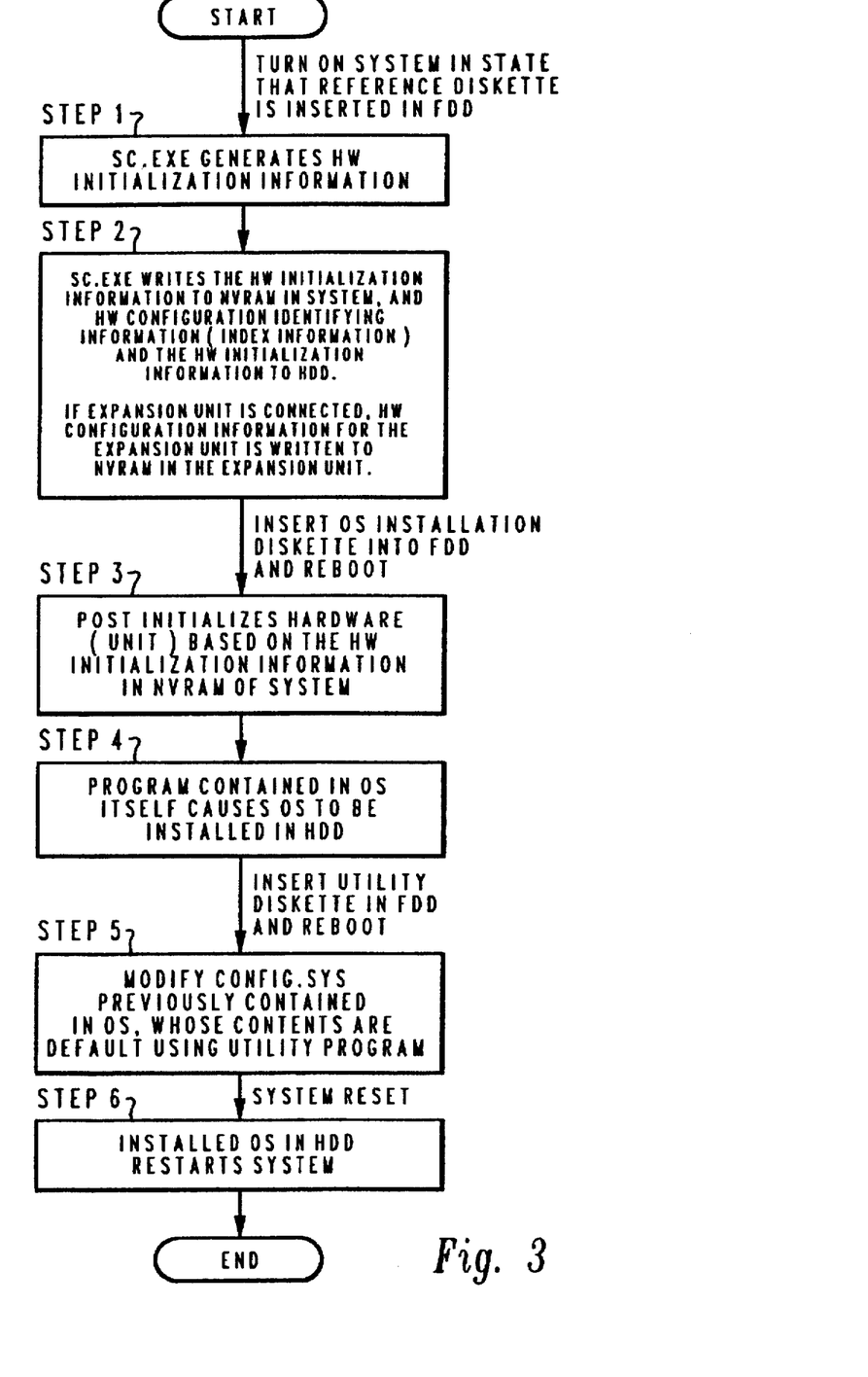
FIG. 3 is a flowchart showing the generation of the hardware initialization information and the processing for the system configuration according to the present invention.

FIG. 3 shows a flowchart of the processing to be first performed when the information processing system 1 employs a new hardware configuration. The system 1 is turned on in the state that a reference diskette is inserted in the FDD 15. The reference diskette is a floppy disk supplied to the operator with the information processing system 1 and contains the SC.EXE. In step 1 the SC.EXE is executed to generate hardware initialization information. In generating the hardware initialization information, the SC.EXE reads out identifier values (ID) for each adapter card inserted in each slot and expansion units. Further, in generating the hardware initialization information, key input by the operator may be necessary.

In step 2, the SC.EXE writes the hardware initialization information not only to the NVRAM 7 in the system body 10, but also to the system area 11A on the HDD 11 in the form that it can be searched. If an expansion unit is attached, it also writes hardware configuration information on the expansion unit to the NVRAM in the expansion unit. Now as indicated on a screen of the system 1, the system 1 is rebooted in the state that a floppy disk containing an operating system (OS) is inserted in the FDD 15. This booting causes the processing to go to step 3. In step 3, the POST initializes each of units (adapter card, expansion unit, etc.) based on the hardware initialization information in the NVRAM within the system 1.

In step 4, the OS is installed in the HDD 11 by means of an OS installation program contained in the OS itself. When the system 1 is rebooted in the state that a utility diskette is inserted in the FDD 15 after the OS is installed in the HDD 11, the processing goes to step 5. A utility program in the utility diskette allows the operator to generate easily CONFIG.SYS using system configuration defining data, which contain a description of a conditional statement. In the OS, CONFIG.SYS, that is, the contents of default are previously provided. The contents of CONFIG.SYS are modified by means of the utility program. The operator merely answers a question on a hardware configuration displayed on the screen of the system 1 in aid of the utility program.

The processing to be first performed at the time when the information processing system 1 employs the new hardware configuration, ends with step 5. Thereafter, if the system 1 is reset or turned on, the system 1 will restart under the installed OS and an application program comes into a state that it may run on the system 1.

Figure 4:
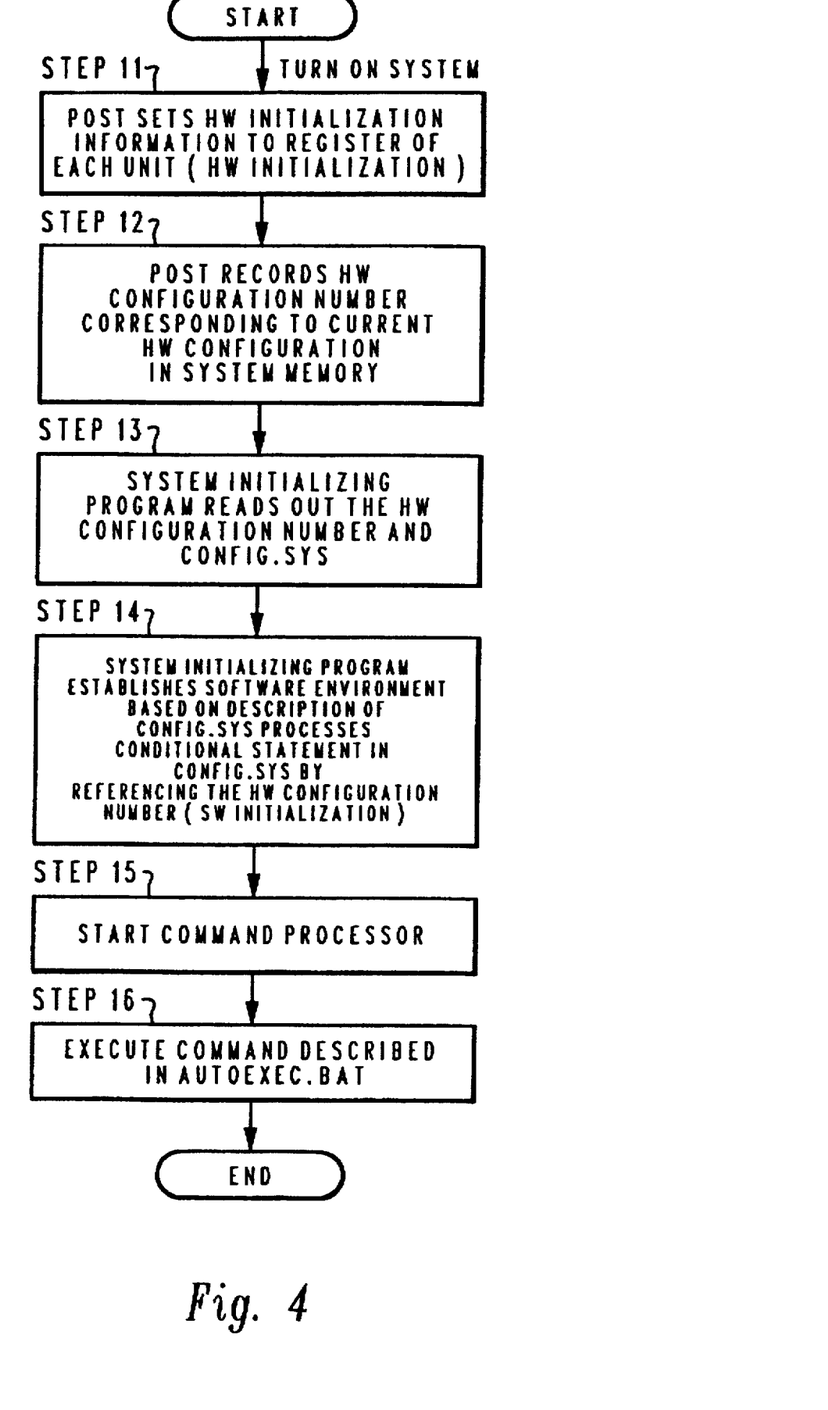
FIG. 4 depicts a flowchart showing an embodiment of a method of initializing the information processing system illustrated in FIG. 1.

FIG. 4 shows a flow of the initialize processing after the hardware initialization information has been generated and the contents of CONFIG.SYS has been modified. In other words, FIG. 4 shows the processing of step 6 in FIG. 3 in more detail. In the figure, when the system is turned on, hardware initialization is performed by means of the POST in step 11. The hardware initialization means sets the hardware initialization information to a register of each corresponding unit.

In the processing of step 11, the POST detects the current hardware configuration for the system 1, and then in step 12, it records a hardware configuration number corresponding to the detected hardware configuration in the BIOS data area of the system memory 9. The POST functions as the detection means for detecting the current hardware configuration. In step 13, a system initializing program causes the hardware configuration number recorded in the system memory and CONFIG.SYS to be read out. In step 14, the system initializing program causes an environment on software to be established, that is, the software to be initialized. The system initializing program may be a different program from the OS, or may be a program contained in part of the OS, for example, a kernel of the OS.

Figure 5:
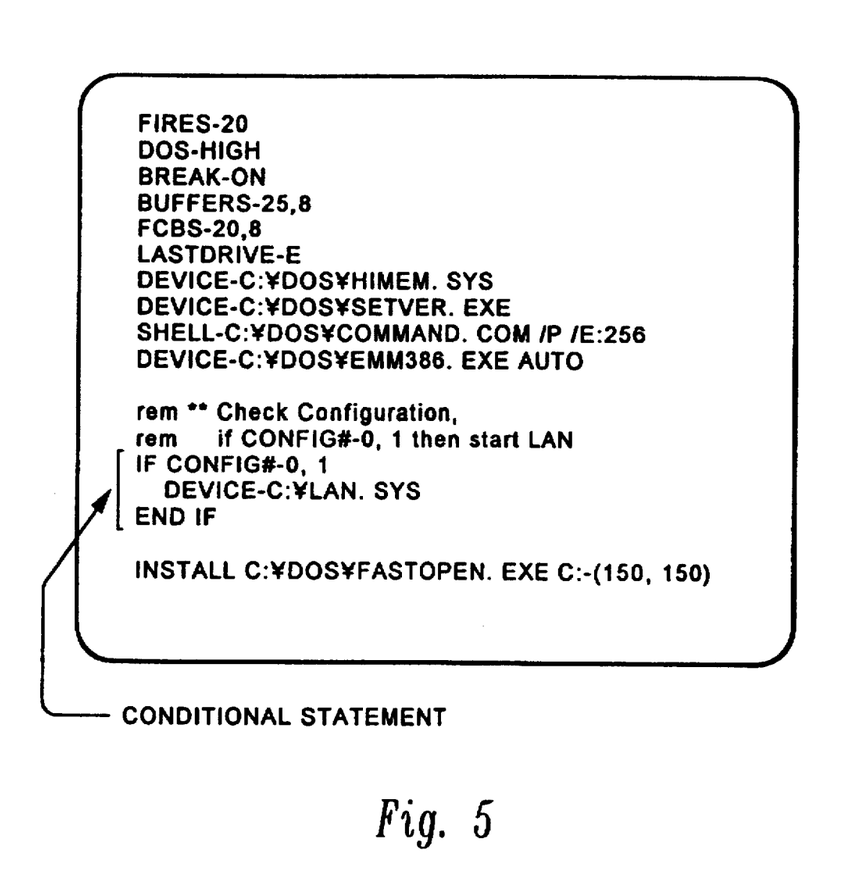
FIG. 5 shows the contents of the system configuration defining data according to flowchart in FIG. 4.

In the following, initializing the software in step 14 is described in detail by referring more particularly to FIG. 5. FIG. 5 shows the contents of a file named CONFIG.SYS. The CONFIG.SYS file describes an environment on the software and the system initializing program establishes the software environment based on the contents of the CONFIG.SYS. FILES=20 in line 1 defines that a maximum of the number of files that can be opened simultaneously is 20. DOS=HIGH in line 2 to LASTDRV=E in line 6 each describe the software environment. DEVICE=C: DOS HIMEM.SYS in line 7, DEVICE=C: DOS SETVER.EXE in line 8, and DEVICE=C: DOS EMM386.EXE AUTO in line 10 describe that any device driver program is installed in the system memory so that the OS or an application program can be used. Further, SHELL=C: DOS COMMAND.COM /P E:256 in line 9 specifies a command processor with parameters. The contents of the lines 1 to 10 are well known in the prior art.

Noticeable lines are lines 11 to 13, which include a description of a conditional statement. IF CONFIG#0,1, in line 11, specifies a condition that a description preceded by the line is executed if a hardware configuration number read out by step 13 in FIG. 4 is 0 or 1. DEVICE=C: LAN.SYS, in line 12, describes that a device driver program named LAN.SYS is installed. The description of the conditional statement in lines 11 and 12 specifies that if a current hardware configuration is such a configuration that corresponds to the hardware configuration number of 0 or 1, the device driver program named LAN.SYS is installed, but otherwise, the device driver program named LAN.SYS is not installed. Referring to FIG. 1, if either the expansion unit #E0 or #E1 is connected to the system body 10, the LAN.SYS will be installed, but if no expansion unit is connected to it, the device driver program named LAN.SYS will not be installed.

END IF in line 13 indicates that the description of the conditional statement in lines 11 and 12 ends with it. Further, INSTALL C: DOS FASTOPEN.EXE C:=(150, 150) specifies an environment for software, which is nothing but the prior art. Immediately followed by line 11 is "rem **Check Configuration, rem if CONFIG#=0,1 then start LAN", which is a comment statement to identify the contents of the processing in lines 11 and 12 to the operator and not interpreted by the system initializing program.

Referring back to FIG. 4, after step 14 completed the software initializing processing, step 15 starts the command processor, and then step 16 executes the command described in AUTOEXEC.BAT. All the initialize processing is thus completed, so that the application program comes into a state that it may run.

Figure 6:
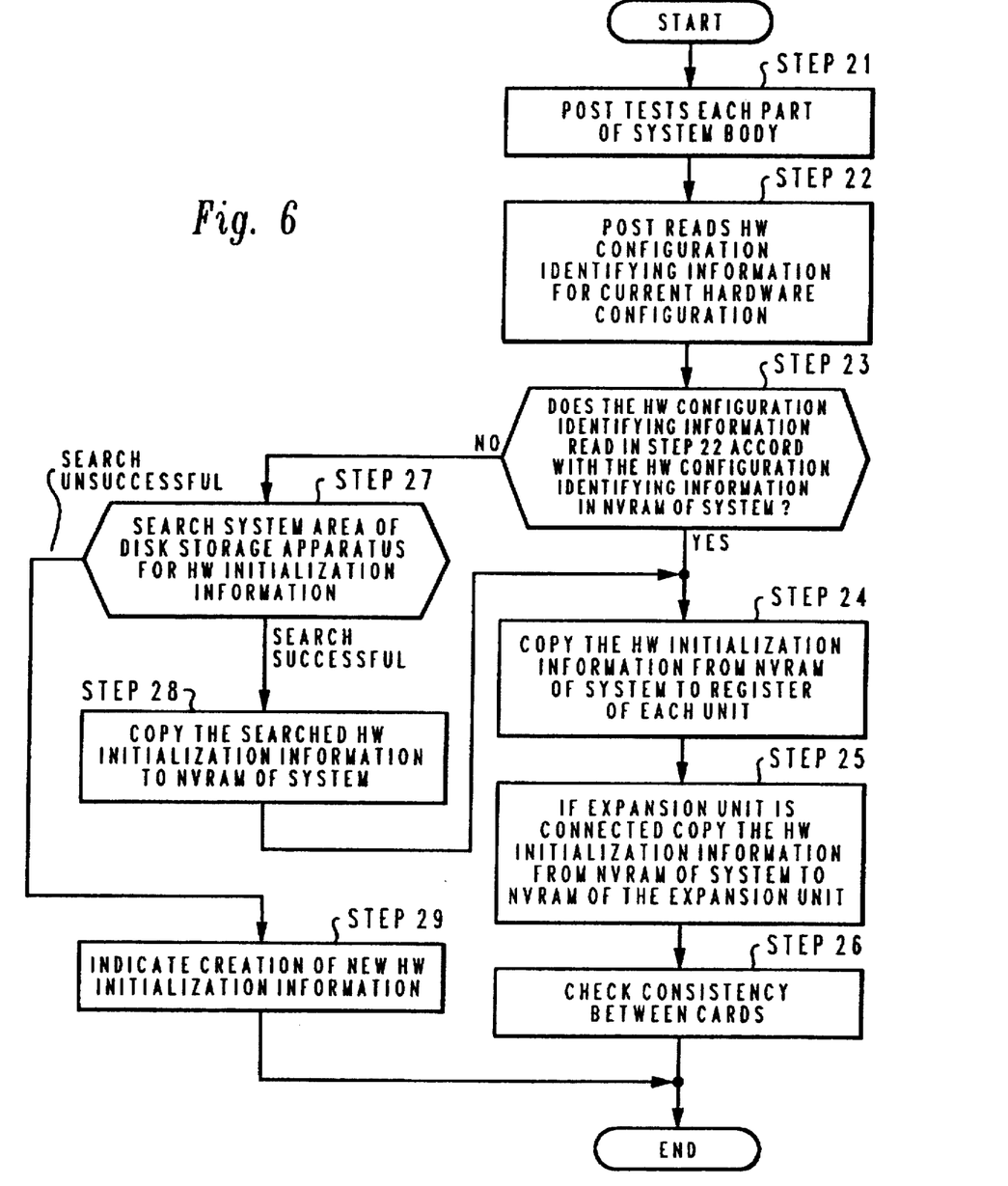
FIG. 6 depicts a flowchart showing the processing for initializing hardware according to the present invention.

FIG. 6 shows the contents of the initialize processing of hardware in step 11 in FIG. 4 in more detail. In in step 21 of FIG. 6, the POST attempts self-diagnosis for each part of the system body 10. In step 22, the POST reads out identifier values for adapters connected to the system body 10 or information in the NVRAMs 25 on expansion units as well as the identifier values for the adapter cards, etc., if the expansion units are connected. That is, in step 22, hardware configuration identifying information (Refer to FIG. 2) on a current hardware configuration is read out. In step 23, the hardware configuration identifying information read out in step 22 is compared with the hardware configuration identifying information in the hardware initialization information previously stored in the NVRAM 7 of the system body 10.

If they accord with each other as a result of the comparison, the processing goes to step 24. Step 24 copies part to be copied to the POS register 23 on each card from the hardware initialization information contained in the NVRAM 7 of the system body 10, to the register 23. If an expansion unit is connected, then step 25 copies hardware initialization information on the expansion unit from the NVRAM 7 of the system body 10 to the NVRAM 25 on the expansion unit. Then step 26 checks the consistency of the hardware initialization information among units and then the processing is completed.

If disaccord occurs as a result of comparison in step 23, the processing goes to step 27. Step 27 searches the system area 11A of the HDD 11 for hardware initialization information with the hardware configuration identifying information on the current hardware configuration read out by step 22. If hardware initialization information is in accord with the current hardware configuration identifying information found in the system area 11A, then the processing goes to step 28 where the hardware initialization information corresponding to the hardware configuration identifying information is copied from the system area 11A to the NVRAM 7 of the system body 10 and then the processing goes to step 25. If identical hardware initialization information is not found in the system area 11A in step 27, the processing goes to step 29 where the processing is completed with an indication of the generation of new hardware initializing information. The processing for generating new hardware initializing information was described by reference to FIG. 3.

According to the embodiment, even after hardware configuration for the information processing system 1 changes, a software environment suitable for a hardware configuration may be automatically established without the operator's intervention. The embodiment is therefore advantageous to such a case where expansion units are frequently attached or detached to or from a notebook PC, or card-type peripheral apparatuses are frequently attached or detached to or from the notebook PC.

Further, in the embodiment, units such as adapter cards, expansion units, and the like, each have their own identifiers (ID) and programs such as POST, OS, for example, reference such IDs for the units to detect a current hardware configuration. However, it will be recognized that the application of the present invention is not limited to such a case where the units hold their own IDs. Even if the units do not hold their own IDs, a signal level may be detected at a certain pin of a connector on the side of the system body to check whether a certain unit to be connected is actually connected to the connector, and accordingly to detect that any current hardware configuration may be taken. Particularly, if the types of hardware configuration an information processing system takes are restricted, a current hardware configuration may be often detected even if units do not hold their own IDs.

Further, it will be appreciated that establishing a software environment is not limited to such setup of a software environment associated with the OS and such specification of the device driver program to be installed in the system as described in relation to the embodiment. That is, establishing software environment in the present invention involves determining whether an application program is started or not.

As described above, according to the present invention, an information processing system and a method of initializing the information processing system in which, even if hardware configuration for the information processing system changes, a software environment suitable for the newly detected hardware configuration may be automatically established.

While the invention has been particularly shown and described with reference to a preferred embodiment, it will be understood by those skilled in the art that various changes in form and detail may be made therein without departing from the spirit and scope of the invention.

What is claimed is:

1. An information processing system having a set of different hardware configurations, each hardware configuration based on one or more add-on units being attached or detached to or from said information processing system and having a stored initialization data corresponding to a configuration, said information processing system comprising:

means for detecting a current hardware configuration of said information processing system;

means for comparing the current configuration to the stored initialization data to detect a change of configuration and for determining, in the event of a change, an identifier for a corresponding identified system, if any;

means for holding multiple versions of system configuration defining data for initialization of said information processing system, each of said multiple versions of system configuration defining data corresponding to an identifier for a corresponding identified system;

means, responsive to said means for comparing finding a change, for initializing the system by using a particular version of the associated stored initialization information, if the compare means finds a corresponding identifier, and by using system configuration defining data if there is no correspondence, said initializing means including means for storing initialization data change for such data which does not correspond to an identifier and for associating it with an identifier; and means for associating user supplied software system configuration file components with corresponding hardware identifiers and for selectively activating components associated with the identifier for the current configuration utilizing conditional logic defined in said software system configuration file.

2. An information processing system according to claim 1 wherein said comparing means selects a corresponding identifier by reference to stored initialization data images.

3. An information processing system according to claim 2 wherein the initialization data is stored on non-volatile memory and the initialization data images are stored on a non-volatile storage device.

* * * * *